United States Patent
Curry et al.

(10) Patent No.: US 7,366,357 B2
(45) Date of Patent: Apr. 29, 2008

(54) SYSTEMS AND METHODS FOR ADJUSTING IMAGE DATA TO FORM HIGHLY COMPRESSIBLE IMAGE PLANES

(75) Inventors: Donald J. Curry, San Mateo, CA (US); Asghar Nafarieh, Menlo Park, CA (US); Doron Kletter, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 721 days.

(21) Appl. No.: 10/776,603

(22) Filed: Feb. 12, 2004

(65) Prior Publication Data

US 2005/0180648 A1  Aug. 18, 2005

(51) Int. Cl.
*G06K 9/36* (2006.01)
*G06K 9/34* (2006.01)
*G06K 9/46* (2006.01)
*G06K 9/00* (2006.01)

(52) U.S. Cl. .................. 382/243; 382/305; 382/173; 382/166

(58) Field of Classification Search ........... 382/243, 382/305
See application file for complete search history.

(56) References Cited

U.S. PATENT DOCUMENTS

| | | | |
|---|---|---|---|
| 4,849,914 A | 7/1989 | Medioni et al. | |
| 5,515,452 A | 5/1996 | Penkethman et al. | |
| 5,583,659 A | 12/1996 | Lee et al. | |
| 5,745,596 A | 4/1998 | Jefferson | |
| 5,778,092 A * | 7/1998 | MacLeod et al. | 382/176 |
| 5,900,953 A | 5/1999 | Bottou et al. | |
| 6,058,214 A | 5/2000 | Bottou et al. | |
| 6,259,810 B1 * | 7/2001 | Gill et al. | 382/166 |
| 6,324,305 B1 | 11/2001 | Holladay et al. | |
| 6,343,154 B1 | 1/2002 | Bottou et al. | |
| 6,400,844 B1 | 6/2002 | Fan et al. | |

(Continued)

FOREIGN PATENT DOCUMENTS

DE  199 58 553 A1  6/2001

(Continued)

OTHER PUBLICATIONS

Richardson, "H.264 and MPEG-4 Video Compression: Video Coding for Next-generation Multimedia.", 2003, Wiley, p. 16-17.*

(Continued)

*Primary Examiner*—Jingge Wu
*Assistant Examiner*—Max Shikhman
(74) *Attorney, Agent, or Firm*—Oliff & Berridge, PLC

(57) ABSTRACT

The image data is processed into a background plane and a plurality of foreground planes. Holes are inserted onto the background plane, in regions which are assigned to a foreground plane. The background plane is sub-sampled, and holes remaining in the sub-sampled image are filled with the average color of the non-zero sub-sampled pixels over pre-determined blocks such as JPEG blocks. If a block is entirely made of holes, the block is filled with a constant color that is propagated from the average color of a previous block. The resulting background plane is far smoother than the original image data and thus can be effectively sub-sampled and highly compressed without adverse deterioration in reconstructed image quality.

17 Claims, 14 Drawing Sheets

U.S. PATENT DOCUMENTS

| | | | |
|---|---|---|---|
| 6,608,928 | B1 | 8/2003 | Queiroz |
| 6,633,670 | B1 | 10/2003 | Matthews |
| 6,731,800 | B1 | 5/2004 | Barthel et al. |
| 2003/0123729 | A1 | 7/2003 | Mukherjee et al. |
| 2005/0036694 | A1* | 2/2005 | Li et al. .................. 382/232 |
| 2005/0111731 | A1* | 5/2005 | Bai et al. .................. 382/173 |

FOREIGN PATENT DOCUMENTS

| | | |
|---|---|---|
| EP | 0 712 094 A2 | 5/1996 |
| EP | 1 006 711 A2 | 6/2000 |
| EP | 1 006 716 A2 | 6/2000 |

OTHER PUBLICATIONS

Gonzalez, Digital Image Processing, 2002, Prentice Hall, 2/E, p. 235.*
R. De Queiroz, "Compression of Compound Documents," *IEEE*, Oct. 1999, pp. 209-213.
U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.
U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,612, filed Feb. 12, 2004, Curry et al.
U.S. Appl. No. 10/776,509, filed Feb. 12, 2004, Claasen et al.
U.S. Appl. No. 10/776,508, filed Feb. 12, 2004, Curry et al.
U.S. Appl. No. 10/776,516, filed Feb. 12, 2004, Curry et al.

* cited by examiner

SYSTEMS AND METHODS FOR ADJUSTING IMAGE DATA TO FORM HIGHLY COMPRESSIBLE IMAGE PLANES

This invention is related to U.S. patent applications Ser. Nos. 10/776,515, 10/776,514, 10/776,608, 10/776,602, 10/776,620, 10/776,509, 10/776,508, 10/776,516 and 10/776,612 filed on an even date herewith and incorporated by reference in their entireties.

BACKGROUND OF THE INVENTION

1. Field of Invention

This invention is directed to generating high compression data files from uncompressed image data. In particular, this invention is directed to organizing image data into different binary and contone planes which are highly compressible.

2. Related Art

Documents scanned at high resolutions typically require very large amounts of storage space. Furthermore, a large volume of image data requires substantially more time and bandwidth to manipulate, such as transferring over a local or wide area network, over an intranet, an extranet or the Internet, or other distributed networks.

Documents, upon being scanned using a scanner or the like, are typically defined using an RGB color space, i.e., in raw RGB format. However, rather than being stored in this raw scanned RGB format, the document image data is typically subjected to some form of data compression to reduce its volume, thus avoiding the high costs of storing such scanned RGB document image data.

Lossless run-length compression schemes, such as Lempel-Ziv (LZ) or Lempel-Ziv-Welch, (LZW), do not perform particularly well on scanned image data or, in general, image data having smoothly varying low-spatial frequencies such as gradients and/or natural pictorial data, while lossy methods such as JPEG, work fairly well on smoothly varying continuous tone (contone) image data. However, lossy methods generally do not work particularly well on binary text and/or line art image data, or, in general, on any high spatial frequency image data containing sharp edges or color transitions, for example.

A new approach to satisfying the compression needs of data, such as the different types of image data described above, is to use an encoder pipeline that uses a mixed raster content (MRC) format to describe the data. The image data, such as for example, image data defining a composite image having text intermingled with color and/or gray-scale information, is segmented into two or more planes. These planes are generally referred to as the background plane and the foreground planes. A selector plane is generated to indicate, for each pixel in the composite image, which of the image planes contains the actual image data that should be used to reconstruct the final output image. Segmenting the image data into planes in this manner tends to improve the overall compression of the image, because the data can be arranged into different planes such that each of the planes are smoother and more readily compressible than is the original image data. Segmentation also allows different compression methods to be applied to the different planes. Thus, the most appropriate compression technique for the type of data in each plane can be applied to compress the data of that plane.

SUMMARY OF THE DISCLOSURE

Unfortunately, some image document formats, such as the portable document format (PDF), do not currently fully support such three-layer mixed raster content decompositions of an original document. As a result, when attempting to print or otherwise render a document that has been compressed and stored as a mixed raster content image data file using such image document formats, the document either cannot be rendered at all, or contains objectionable artifacts upon rendering.

Systems and methods are provided for converting a document to a mixed raster content format having a plurality of binary foreground planes. After scanning the document, the image data is analyzed to identify regions having similar image characteristics. Each of the regions is then lifted into one of the plurality of binary foreground planes. The lifting of the regions leaves holes in the background layer, which will be overwritten upon reproduction of the compressed image from the binary foreground planes. Thus, the hole areas in the background layer may contain data which is not critical to the proper reproduction of the original document image. These hole areas can be filled with data to enhance various properties of the background layer. For example, the hole areas may be filled with the average color of the nearby pixels, thereby improving the compression characteristics of the background layer.

While multiple binary foreground plane image data is discussed here as an example, the invention can be used wherever regions of less critical data can be identified in an image. Other such situations may include regions which are outside the printable area of the image, or regions which will be overwritten by other data not part of the original image data. In such cases, the data in the identified region may be substituted with data that enhances certain other image properties, such as compressibility of the image.

BRIEF DESCRIPTION OF THE DRAWINGS

The invention is described, with reference to the following figures, wherein.

DETAILED DESCRIPTION

An image processing system is presented which separates regions in an image into a contone background plane and a plurality of foreground planes. Pixels in the image which share certain features, such as color and spatial proximity properties, are grouped together and represented by one of N binary foreground planes, in order to improve image processing, such as more effective compression of the image data. Pixels not represented by any of the foreground planes are left in the contone background plane. Each plane is then independently compressed using an appropriate standard compression method such as JPEG for the contone background plane and CCITT G4 for a binary plane. When reproducing the image, some regions in the background plane are overwritten by data in the foreground plane. Thus, these regions in the background plane are less critical to the proper reproduction of the document image. Therefore, the data in these regions can be replaced with data which improves a characteristic of the background plane, such as its compression ratio. For example, these regions can be replaced with data which is an average color value of the neighboring regions, such that the boundary between the replaced regions and the remaining background pixels is more gradual than would otherwise be.

For ease of discussion, the following uses compression characteristics as an example. However, improvement in other image characteristics may be implemented, such as encoding characteristics.

Figure 1:
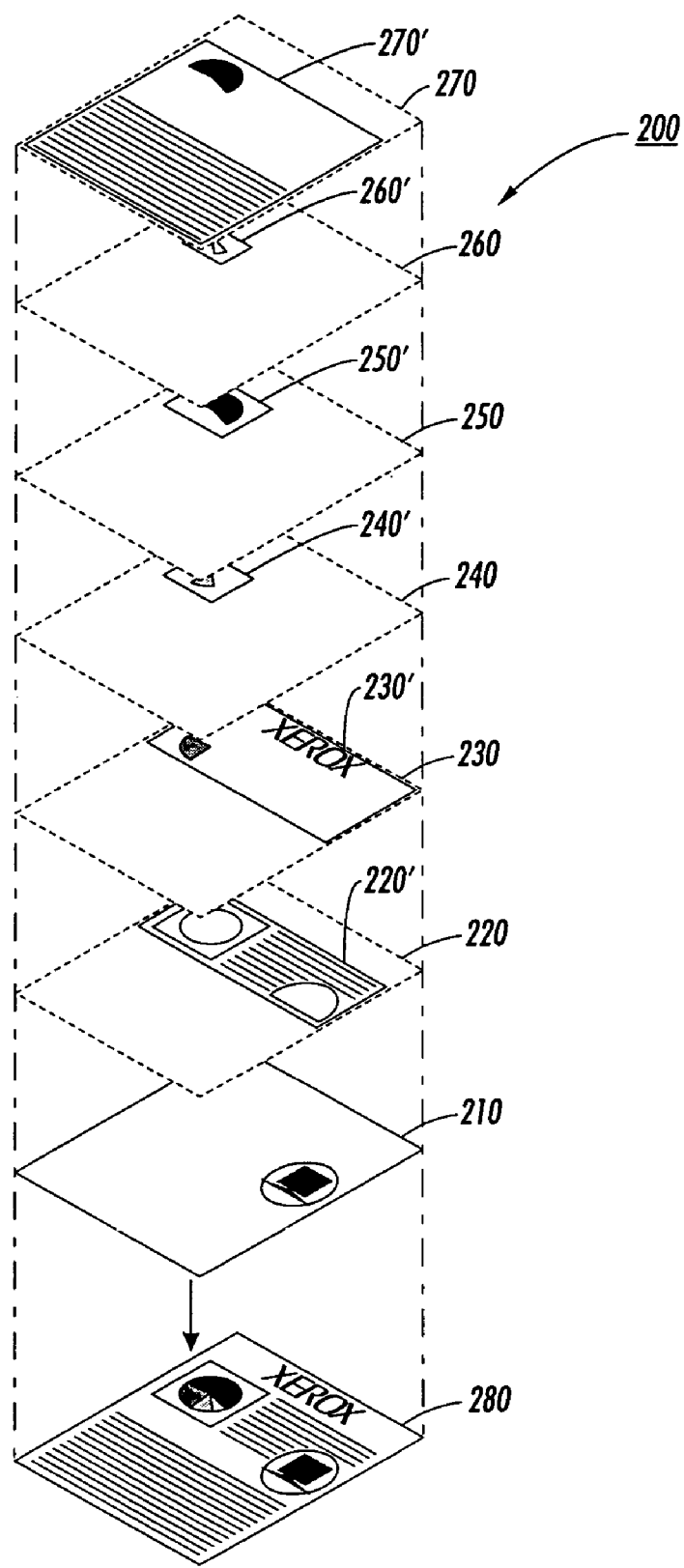
FIG. 1 illustrates an exemplary image separated into multiple image planes and the resulting rendered document image.

FIG. 1 shows a document image decomposed into a background continuous tone or grayscale plane (background plane) 210 and N binary foreground planes, where in this example, there are N=6 binary foreground planes numbered 220-270. Each of the N binary foreground planes 220-270 may define the spatial extents of low spatial frequency color image data to be combined onto the background plane 210. Each of the N binary foreground planes 220-270 may have a specific color associated with that plane.

For example, the image data may contain regions 220'-270' having similar color data that could be separated into six distinct color values. Each of the six color values may be associated with a particular one of the multiple binary foreground planes 220-270. Binary mask data of each of the binary foreground planes 220-270 define the spatial extents of the areas 220'-270' corresponding to each of those six colors.

When reproducing the original image, regions in the background plane 210 that correspond to the binary mask bits that are turned on (i.e., selected) in each of areas 270', 260', 250', 240', 230', and 220' in the foreground planes, may be overwritten by these areas of the foreground planes. Therefore, these regions in the background plane 210 are called holes because the data placed in them do not contribute to the quality of the reproduced image. Thus, the data in these holes may be generated in such manner as to improve desirable characteristics such as enhancing the compression characteristics of the background layer, without affecting the output image quality.

Figure 2:
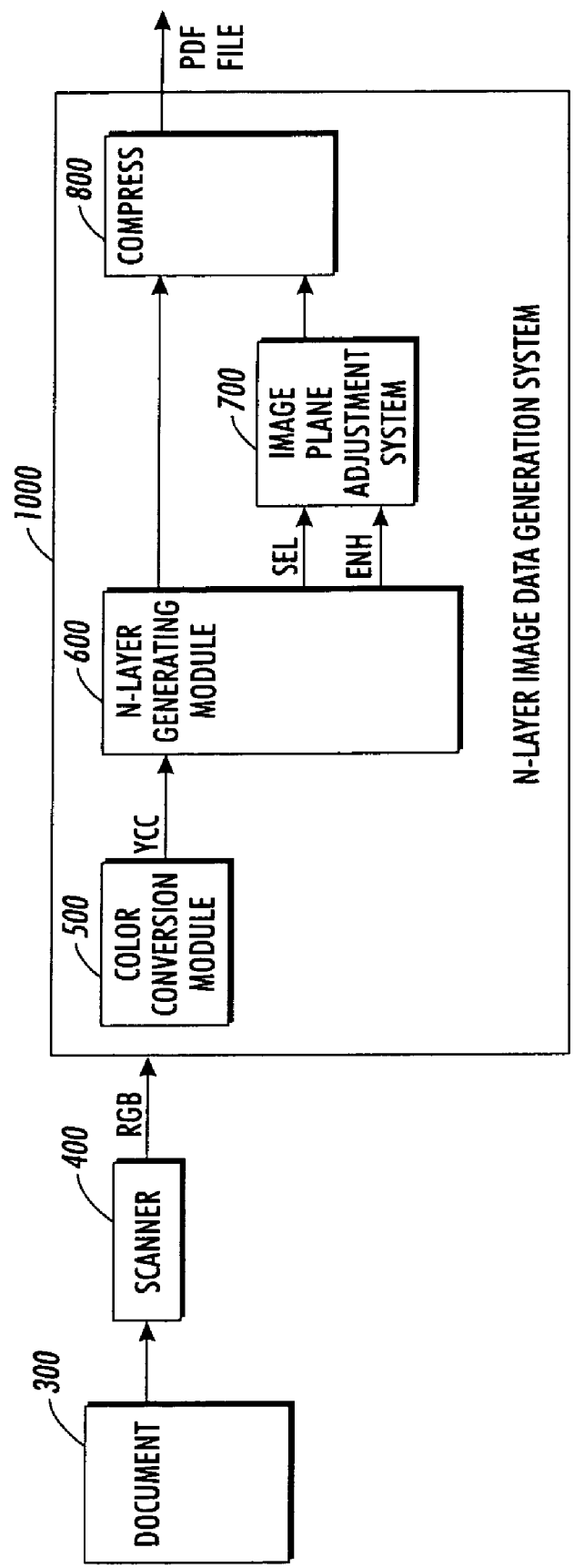
FIG. 2 illustrates an exemplary system in which an image plane adjustment system may operate.

FIG. 2 shows an exemplary process in which N binary foreground planes are produced by image processing device 1000. The original documents are scanned by a scanner 400 generating original image data such as data in an RGB color space, for example. The output of the scanner is then fed to an N-layer image data generating system 1000. The color conversion module 500 of the N-layer image data generating system 1000 may convert the RGB data to a YCC color space. As is well known, the YCC color space includes a luminance component (Y) and two chroma components (CC). The chroma components may be subsampled at a 2:1 ratio, at least in one direction if not in both, so that there are half as many data points in the chroma components as there are in the luminance components. The image in the YCC color space may be input to an N-layer generating module 600 to generate a N binary foreground layers.

The N-layer generating module 600 analyzes the input image and detects regions which share certain characteristics, such as similar color values. The N-layer generating module 600 then combines the detected regions into larger regions which share similar color characteristics and overlap spatially. The N-layer generating module 600 then assigns the combined larger regions to one of N foreground planes, depending on the color value of the combined region. The remaining image data which is not included in a foreground plane, is included in a background plane. The background plane generated by the N-layer generating system is input to the image plane adjustment system 700, which adjusts the data in the background plane to improve the compression characteristics of the background plane. The foreground and background planes are then compressed by the compression module 800, using JPEG algorithm for the contone background plane and CCITT G4 for binary foreground planes, for example, before being output to a file such as a PDF or TIFF file.

Figure 3:
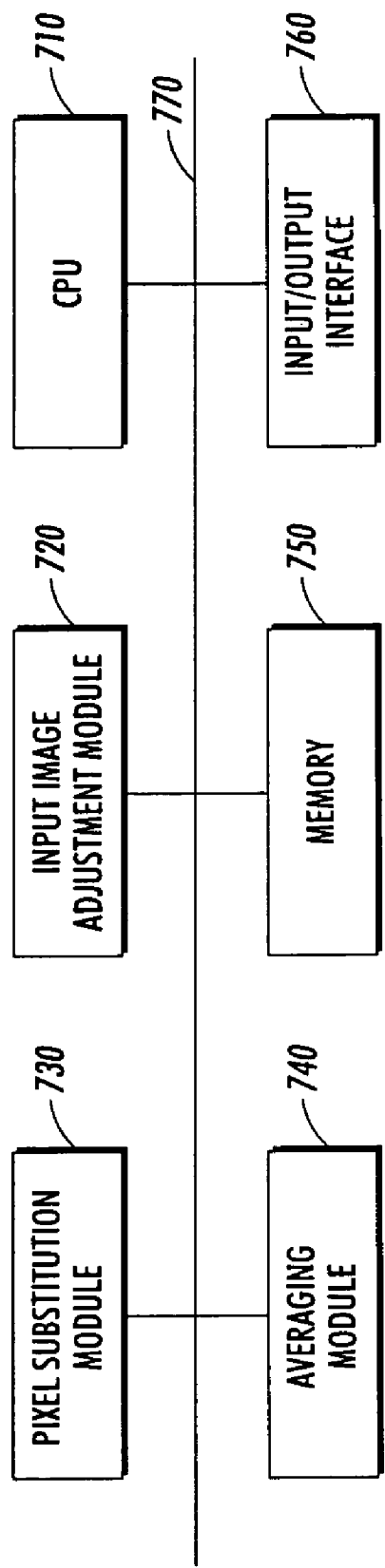
FIG. 3 shows an exemplary functional block diagram of the image plane adjustment system.

FIG. 3 shows further detail of the image plane adjustment system 700 that may include a CPU 710, a memory 750, an averaging module 740, a pixel substitution module 730, an input image adjustment module 720, and an input/output interface 760. The above components 710-760 may be coupled together via a bus 770. While the image plane adjustment system 700 is illustrated using a bus architecture diagram, any other type of hardware configuration may be used such as using application specific integrated circuits (ASICs) to implement one or more of the components, or writing a computer program that executes in the CPU 710 to perform all the functions of the image plane adjustment system 700, etc.

The image plane adjustment system 700 prepares the background plane for compression. The input/output interface 760 receives the inputs to the image plane adjustment system 700, which may be stored in memory 750, or which may be acted upon as they are received. The following modules act upon the input data: the input image adjustment module 720, the pixel substitution module 730, and the averaging module 740, each of which is discussed in detail below.

Figure 4:
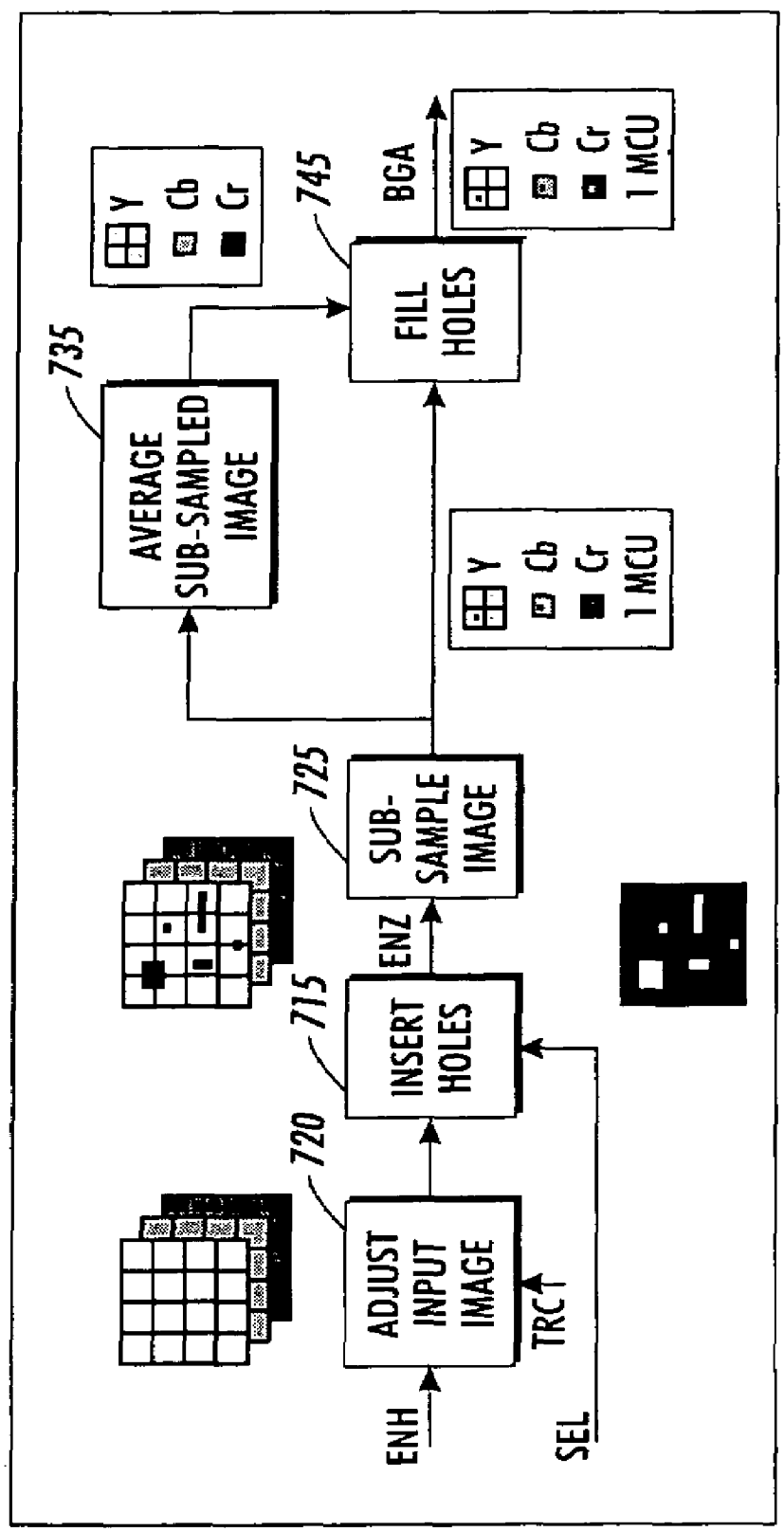
FIG. 4 is a diagram illustrating an exemplary data flow in the image plane adjustment system of FIG. 3.

A flow of the image data processing is shown in FIG. 4. The input image is received by the input image adjuster 720, that adjusts the image color characteristics, for example, of the input image. The hole inserter 715 receives the output from the input image adjuster and inserts holes ("0" data values) into the background plane based on the selector (SEL) data that was generated by the N-layer generating module 600 when creating the foreground and background planes. One particular role of the image adjuster 720 is to reserve one specific pixel value such as "0" for distinguishing holes from otherwise valid pixel values. The sub-sample image module 725, receives the output of the hole inserter 715 and reduces the size of the background plane to improve compression and increase the speed of processing, for example. The sub-sampled output from the sub-sample image module 725 is averaged by the average sub-sampled image module 735, and the average color values generated by the average sub-sampled image module, is used to fill the holes by the hole filler 745. Both the sub-sample image module 725 and the average sub-sampled image module 735 basically perform the same averaging functions. Thus, the function of these modules is performed by the averaging module 740 of FIG. 3. Also, the functions of the hole inserter 715 and the hole filler 745 are similar, and so these functions are both performed by the pixel substitution module 730 of FIG. 3.

The sub-sampling module 725 performs a 2:1 sub-sampling of luminance data by generating one 16×16 block of data for every contiguous and non-overlapping 32×32 block of image data. Each 32×32 block is divided into 256 2×2 blocks for the 2:1 sub-sampling. All the pixels in the 2×2 blocks are averaged to generate one sub-sampled data point for each corresponding 16×16 block. The chroma data may be further sub-sampled by another factor of 2:1 relative to the luminance data (4:1 total). For the 4:1 chroma components, the 32×32 block is divided into 64 4×4 blocks. The data of each 4×4 block is averaged for one data point of the 8×8 sub-sampled block.

The averaging module 740 averages the color content of a neighborhood of pixels by summing the color value of the pixels within the neighborhood, and dividing by the number of non-zero pixels in the neighborhood, which contributed to the sum. Because some neighborhoods consist entirely of zeroes, or holes, their value will remain "0" even after the sub-sampling operation.

After performing the sub-sampling, the averaging module 740 then calculates the average color of an 8×8 block of sub-sampled data. The hole-filler 745 then replaces the "0" indicating a hole in the sub-sampled image, with the average value of the 8×8 block of sub-sampled pixels, thereby "filling" the hole with the average data.

The background image data after insertion of holes and filling the holes with average color data is expected to be much smoother relative to the original data, and therefore can be further sub-sampled to improve compression and processing speed without adverse impact on reproduction quality. The output of the image plane adjustment system 700 is the adjusted, sub-sampled, and filled background plane (BGA), ready for compression.

Figure 5:
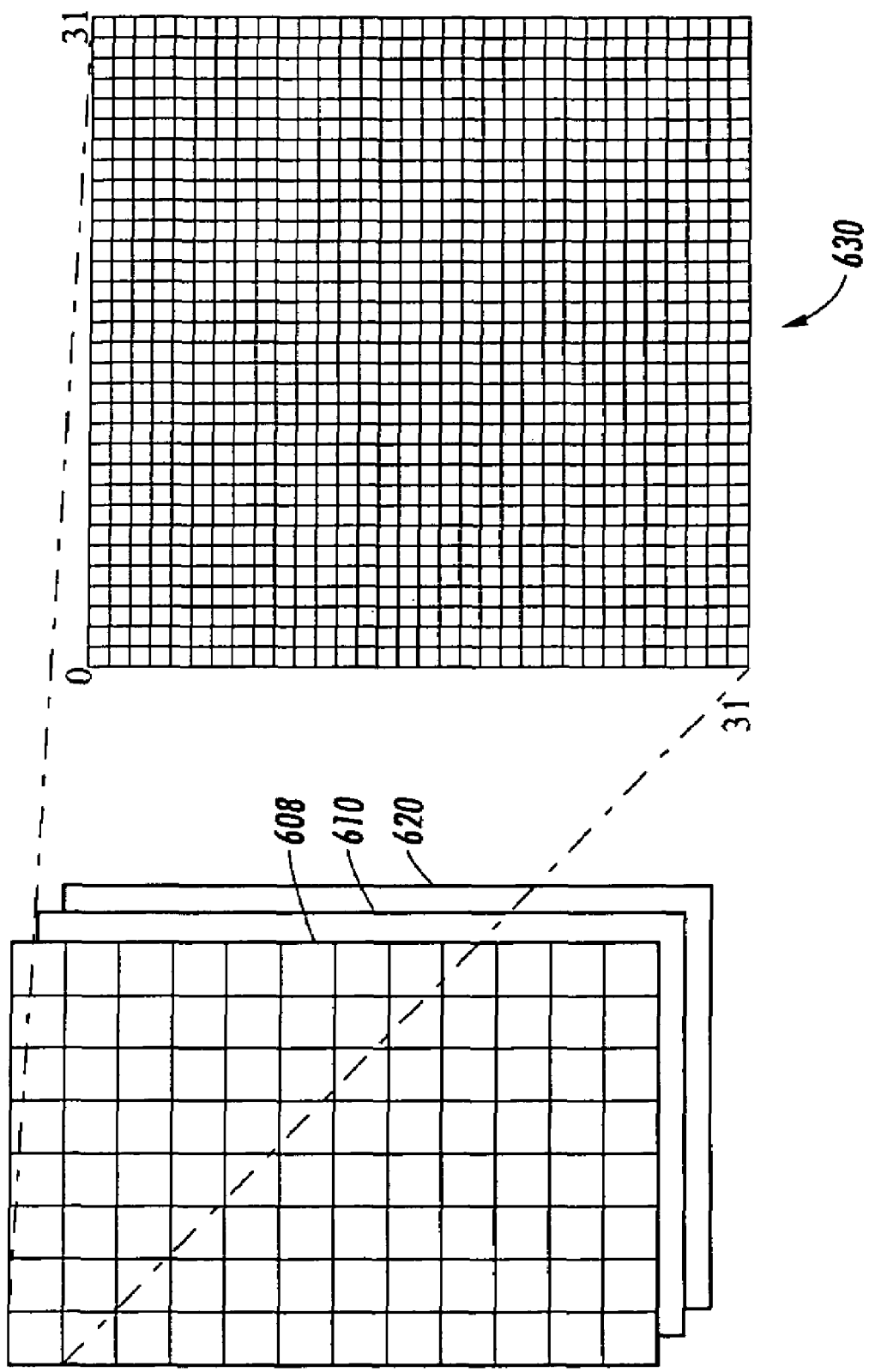
FIG. 5 illustrates an enhanced color data ENH.

The operation of each module indicated in FIGS. 3 and 4 will now be described in detail. The enhanced color data (ENH) from the N-layer generating module 600 is input to the image plane adjustment system 700. The enhanced color data ENH may be the YCC image data output by the color conversion unit 500, that may include enhancement of edge properties around the different regions of the image. An example of a page of the ENH is shown in FIG. 5. Each entry in the ENH may be 3 bytes of eight bits apiece, corresponding to the eight-bit value of luminance, the eight-bit value of chrominance Cb, and the eight-bit value of chrominance Cr. The 24-bit color values may be divided into three separate planes of luminance data (Y), indicated by reference number 600 and chrominance data (Cb, Cr), indicated by reference numbers 610 and 620. The page of 24-bit color data may be divided into 32×32 blocks of contiguous, non-overlapping data sections, such as that indicated by reference number 630, which is the input data amount used by the sub-sampling module 725.

Figure 7:
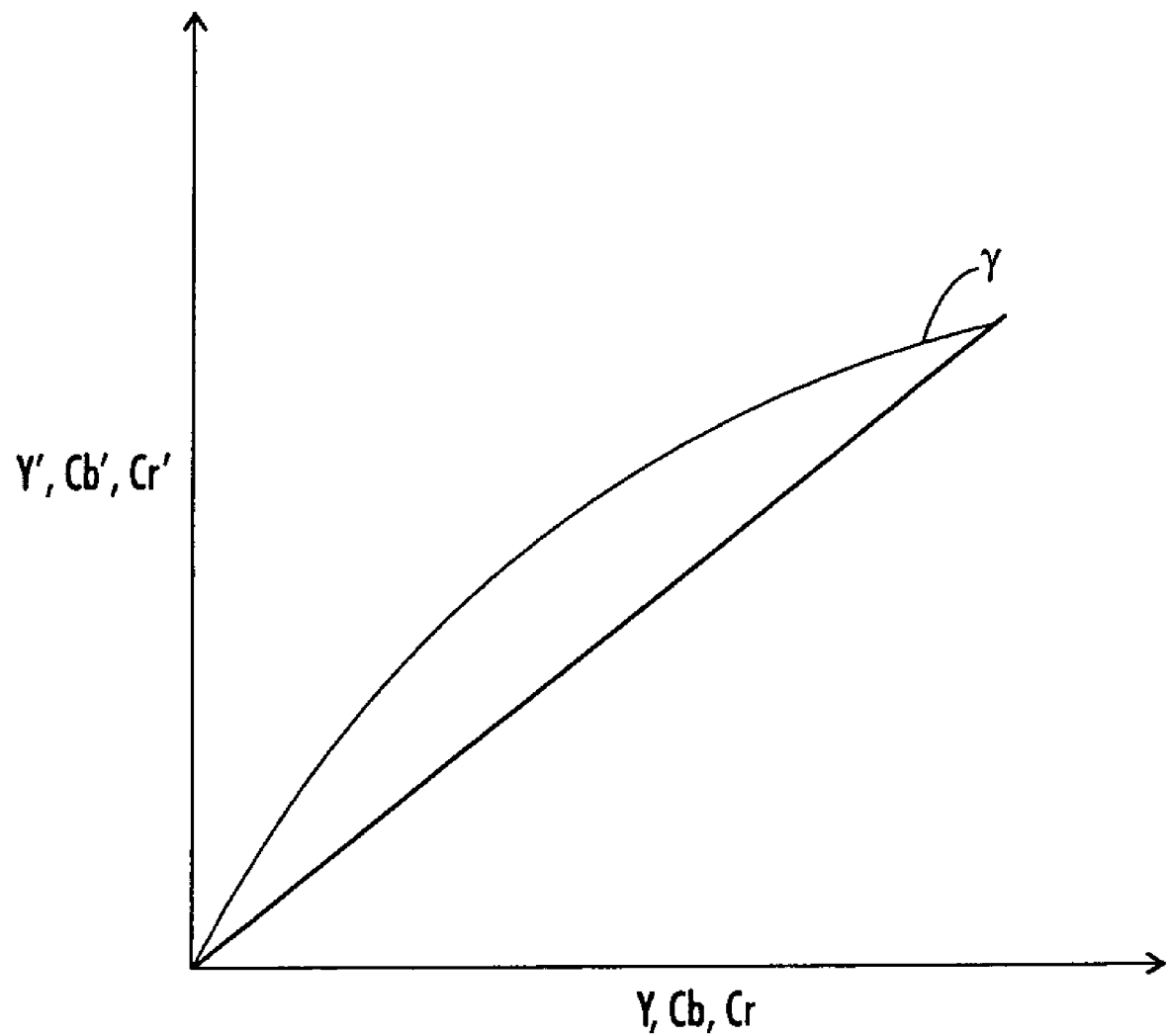
FIG. 7 illustrates a selector plane.

After the ENH is input to the image plane adjustment system 700, final adjustments such as color adjustment and/or gamma correction curve may be made to the image before sub-sampling by the averaging module 740 and compression by the compression module 800. The gamma correction may be applied to exploit a property of the human eye, which is more responsive to brightly lit areas than dimly lit areas. The adjustments may be applied using, for example, three one-dimensional tone reproduction curves (TRCs) to adjust the color characteristics of the input image contained in the ENH from the N-layer generating module 600. A typical tone reproduction curve is shown in FIG. 7, which shows a function relating the output pixel value to the input pixel value. Alternatively, the tone reproduction curve may be in the form of a simple look up table, which maps an input value of luminance or chroma, into a different output value. The module may apply a different one-dimensional TRC to each of the luminance and chroma components.

The input image adjustment module 720 can also be used to apply color suppression to the background layer, or other preferences such as darker-lighter, contrast, color saturation, etc., prior to compression. The input image adjustment module 720 also serves to limit each of the incoming ENH luminance and chroma data to the range of 1 to 255. In this example, the zero value is specifically excluded because this value is convenient to indicate the locations of holes, as will be described further below. Therefore, if the value of "0" occurs in the luminance or chroma channels, the input image adjust module maps it to one.

Lastly, the input image adjustment module 720 may also be responsible for setting the chroma to a neutral midpoint (Cb=Cr=128) when the luminance is 255. This operation ensures that no toner is used for rendering a white neighborhood (Y=255). Otherwise, if Cb or Cr is allowed to be non-neutral, a residue toner amount may be emitted in the YCC conversion to the printer color space of cyan-magenta-yellow-black (CMYK) due to color interpolation accuracy errors in non-neutral areas.

The output of the input image adjustment module 720 is sent to the insert holes module 715. This module reads in the binary selector plane data (SEL) from the N-layer generating module 600, which identifies ENH pixels which are less critical to the proper reproduction of the image, because they may be overwritten by regions assigned to one or more of the binary foreground layers, for example.

Figure 6:
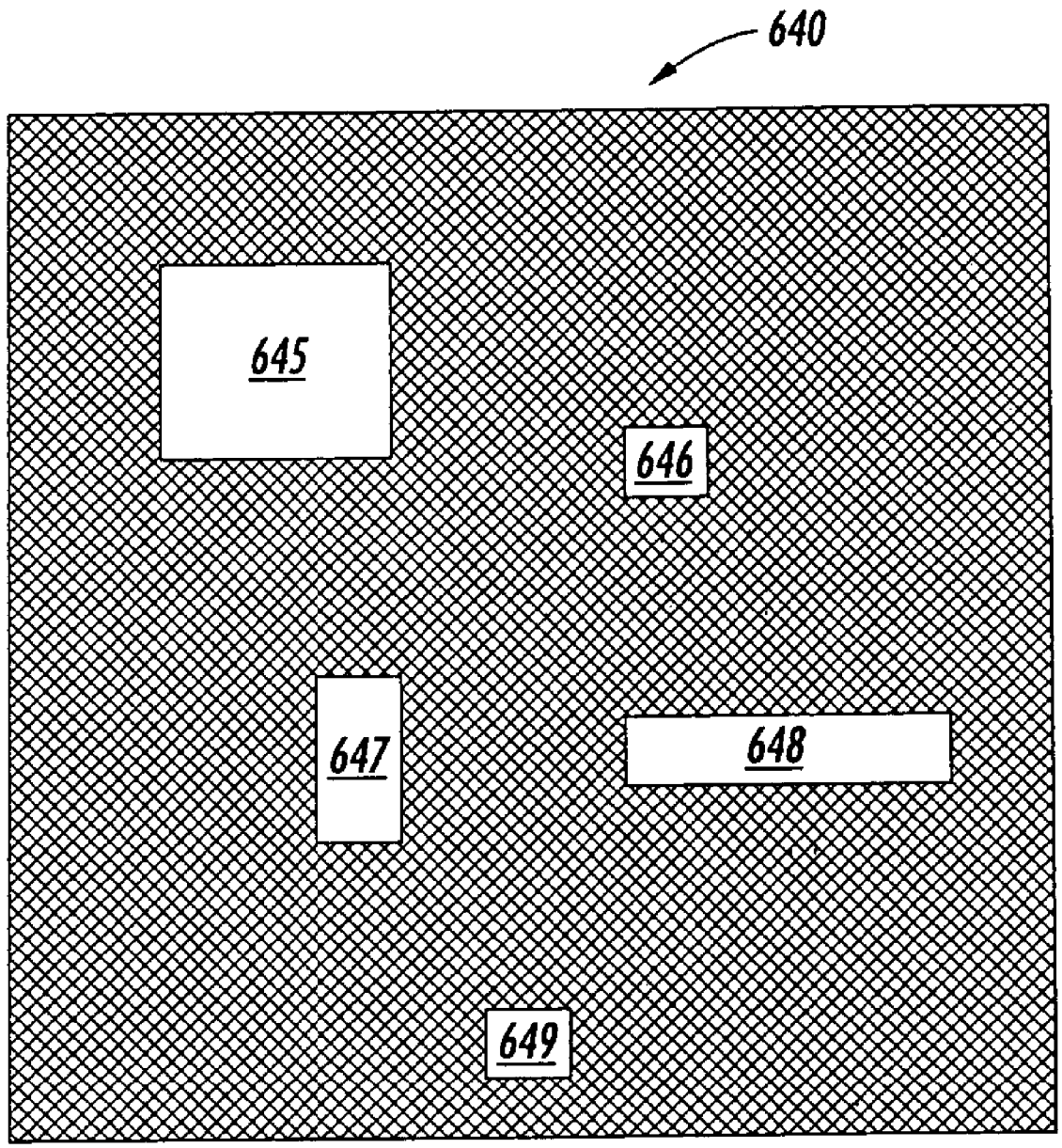
FIG. 6 shows an exemplary tone reproduction curve which may be used to adjust the pixel values of the input image to the image plane adjustment system.

The SEL, shown as 640 in FIG. 6 includes a binary value of "1" corresponding to holes, i.e., regions 645-649, which have been assigned to any one of the binary foreground planes, and a value of "0" for regions which remain in the background plane. The selector plane has the same dimensions as the ENH, shown in FIG. 5.

Since the ENH pixel values corresponding to the regions 220'-210' in FIG. 1, have already been copied into the foreground layers 220-270, the data in these regions of the background plane can be replaced with a zero, reserved for indicating holes. Therefore, insert holes module 715 replaces the color data in the ENH with a zero at any pixel location for which the corresponding selector plane pixel is turned on (SEL=1). The zeros are inserted for all ENH components, that is, for luminance as well as chroma components. The color data in the ENH is left unchanged for all pixel locations for which the selector plane is zero. The pixel substitution module 730 inserts zeros in the pixels which were identified as being less critical to the proper reproduction of the image. The less critical pixels are identified as having selector SEL value of "1".

Figure 8:
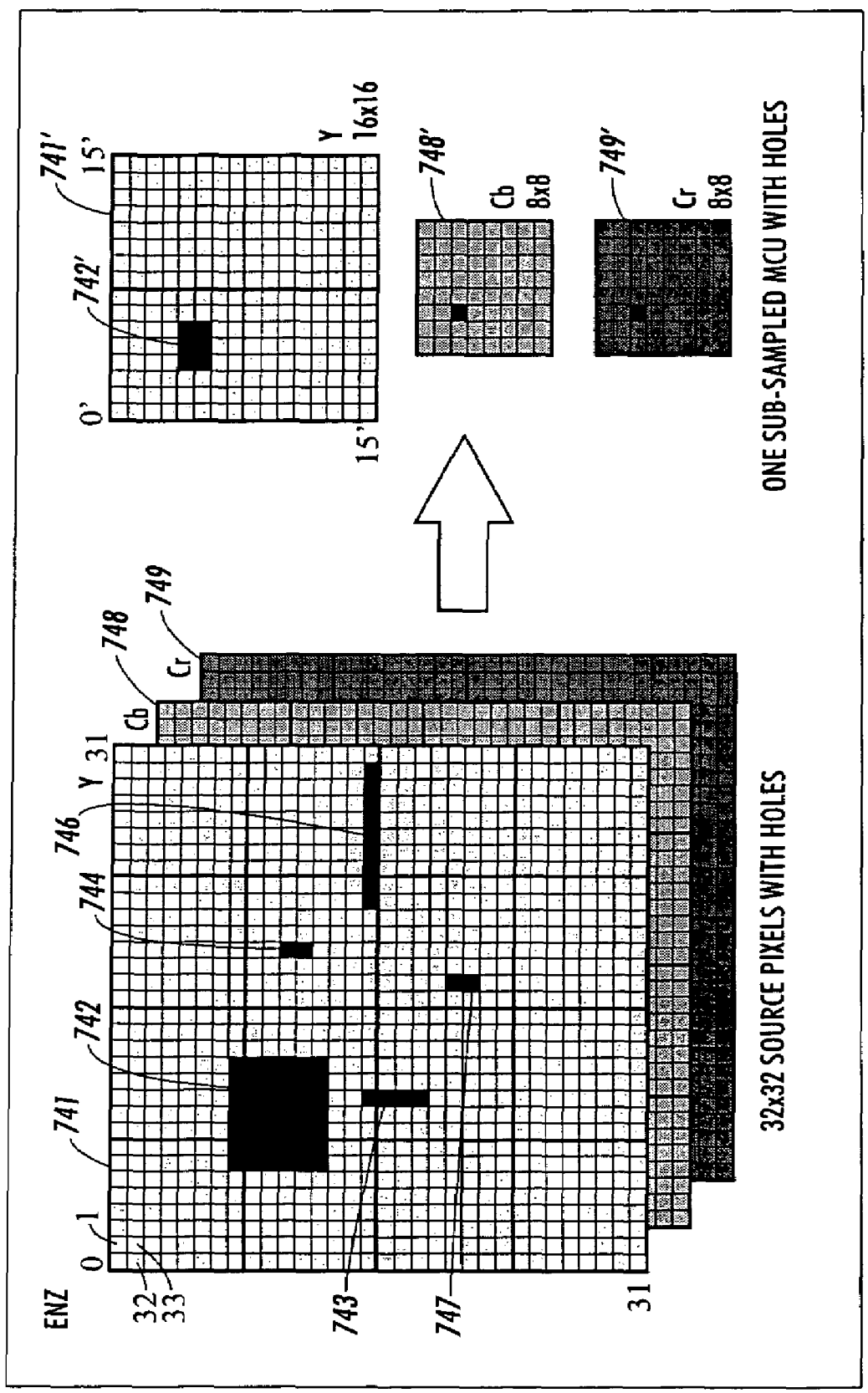
FIG. 8 illustrates the operation of the sub-sampling module.

The process of inserting the holes in the ENH is illustrated in FIG. 8. There, a 32×32 array of ENH pixels that includes blocks of zero pixels 742, 743, 744, 746 and 747. The zeros are shown as black pixels in FIG. 8. The black pixels indicate the location of the holes 742, 743, 744, 746 and 747 in both the luminance data 741 and chroma data, 748 for Cb and 749 for Cr, of the ENH. The "hole-image", that is, the image data with the holes inserted, may be labeled ENZ and transmitted to the sub-sample image module 725.

The image data may be sub-sampled at this stage, to reduce the number of pixels in the image data, and thereby reduce the computation burden on the downstream processes. FIG. 8 also illustrates the process of sub-sampling the 32×32 pixel array, which forms four 8×8 pixel blocks of sub-sampled Y data, and two 8×8 pixel blocks of sub-sampled Cb and Cr data. This group of six 8×8 sub-sampled pixel blocks constitutes a minimum coded unit (MCU) in JPEG 4:2:0 mode, for example. Therefore, the sub-sampling process uses as input contiguous non-overlapping 32×32 pixel arrays of the ENH.

The sub-sampling is performed by the sub-sampling module 725, using the averaging module 740, which averages, for example, a 2×2 pixel luminance neighborhood of the ENZ to output 2:1 sub-sampled data, and further averages a 4×4 pixel neighborhood of the chroma data to generate 4:1 sub-sampled data. The averaging module 740 may work in raster order, from left to right and from top to bottom, for example. The averaging module calculates a sum over a particular set (i.e. neighborhood) of pixels, and divides the sum by the count of pixels in the neighborhood.

For example, to perform the sub-sampling, the luminance data of a contiguous non-overlapping 2×2 neighborhood of pixels is summed, and the sum is divided by the number of valid pixels in the neighborhood. If all four pixels are valid, the sum is divided by four, to generate a single sub-sampled output pixel. Therefore, each 2×2 pixel array of the ENZ luminance channel is mapped to one luminance pixel output. According to this process, each 32×32 block of ENZ yields four 8×8 blocks of sub-sampled luminance data 741'. Similarly, the ENZ chroma data 748 and 749 are further sub-sampled by 2× (4× total), to produce a single block of 8×8 pixels each, 748' and 749'. Therefore, each 4×4 neighborhood of the ENZ chrominance data is mapped to one Cr or Cb pixel output. Each output pixel value is obtained by averaging the corresponding neighborhood area over valid pixels only.

The output of the averaging module 740 is therefore comprised of 4 luminance blocks 741' and one each Cb and Cr blocks 747' and 748', with each block being made up of 8×8 pixels. This unit of six 8×8 blocks forms exactly one JPEG minimum coded unit (MCU) in (4:2:0) mode.

FIG. 8 also shows sample of the output of the sub-sampling module 725. The output of the averaging module still contains holes 742'. In order for a hole to have survived the averaging process, each of the neighborhood pixels must also be a hole. That is, a hole will survive the averaging operation only if the entire neighborhood does not contain even a single valid pixel. In this case, the average neighborhood value would be zero. Therefore, holes persist in the sub-sampled output only in the upper left corners of the Y 741', Cb 747' and Cr 748' output of the averaging module 740. These holes are due to the presence of the larger hole 742 in the upper left corner of the 32×32 source data ENZ. Due to the presence of holes, a hole-filling algorithm is used, as is described further below.

Figure 9:
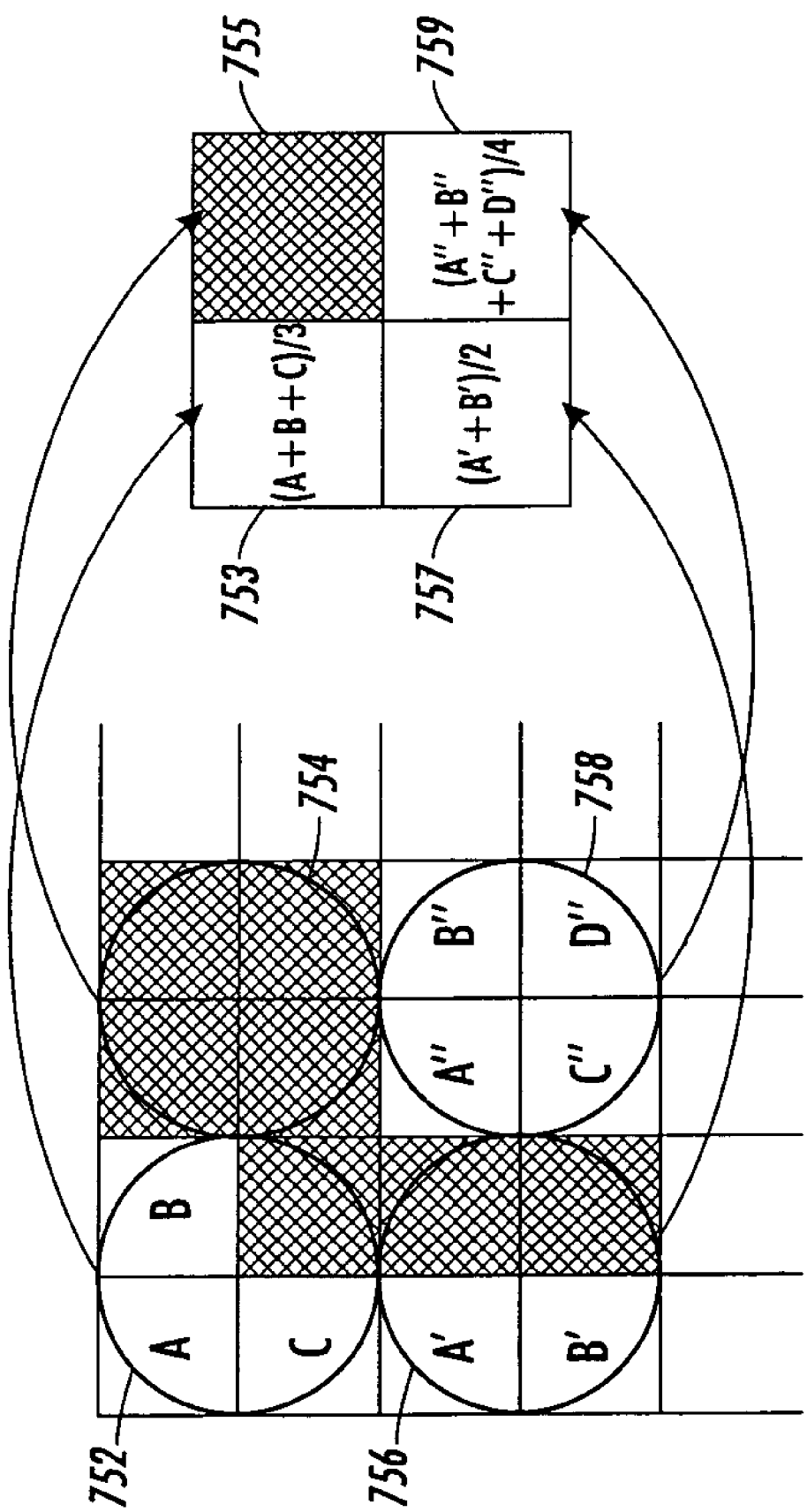
FIG. 9 illustrates in further detail the operation of the sub-sampling module

FIG. 9 depicts the sub-sampling process and the formation of holes in more detail. For clarity, only a 4×4 block of luminance input data is shown, rather than the 32×32 block of input data shown in FIG. 8. The 4×4 block is sub-sampled by summing the color values of each contiguous non-overlapping 2×2 pixel neighborhood for luminance data and dividing by the number of valid pixels in the sum. The first neighborhood of pixels is indicated by reference number 752, the second by reference number 754, the third by reference number 756 and the fourth by reference number 758. The first 2×2 pixel neighborhood 752 has three non-zero pixels, whose values are A, B and C. The fourth pixel has a value of zero. The sub-sampling routine produces a single sub-sampled pixel 753 from the four pixel input, whose value is (A+B+C)/3. The second 2×2 pixel neighborhood indicated by reference number 754, contains all zeroes, and therefore the output pixel 755 is also a hole, with a value of zero. The third 2×2 pixel neighborhood contains two valid pixels with values of A' and B'. The subs-sampled pixel 757 output by the averaging module 740 has the value (A'+B')/2. The fourth 2×2 pixel neighborhood has all valid pixels, A", B", C" and D". Therefore the pixel value of the sub-sampled pixel 759 is (A"+B"+C"+D")/4.

Since the holes are conveniently coded as zeros, the neighborhood sum of pixel values is the same, with or without the holes. However, the number of valid (non-zero) pixels can be different and therefore must be counted for each neighborhood, as described above. The neighborhood pixel sum is normalized by the sum of valid (non-zero) pixel values. To avoid costly divisions, the division may be implemented using a predetermined multiplication table (a lookup table) and round right shift operation.

In order to fill the holes, the average sub-sampled image module 735 calculates a fill color from the average of each 8×8 block of sub-sampled pixels, counting only non-zero pixels and not the remaining holes in the sub-sampled data. Since the holes have a value of zero, the sum of block pixel values is the same with or without the holes. However, the number of valid (non-zero) pixels may be different and therefore must be counted for each block. The average block color is obtained by normalizing the sum of pixel values by the number of valid pixels. To avoid costly divisions, the division may again be implemented via lookup table and right shift operation. Since there are 4 luminance blocks and one each of Cr and Cb blocks, a total of six average numbers (one per block) are produced. Each average is an 8-bit monochrome number. Therefore, for the 2×2 sub-sampled block shown in FIG. 9, the average block color is ([(A+B+C)/3]+[(A'+B')/2]+[(A"+B"+C"+D")/4])/3.

The exemplary method of calculating the average block color is similar to the method for sub-sampling, with the exception of the count size. Therefore, both the sub-sampling and the block color averaging may be performed by the averaging module 740. In the case of the sub-sampling, the count size is generally either 2×2 (luminance) or 4×4 (chroma), depending on the number of non-zero pixels. For the average block color calculation, the count size is generally 8×8, depending on the number of non-zero pixels.

Finally, the fill holes module 745 processes each 8×8 block at a time, using the pixel substitution module 730. It replaces the zero content for all hole pixels in each block with the average color of that block.

Figure 10:
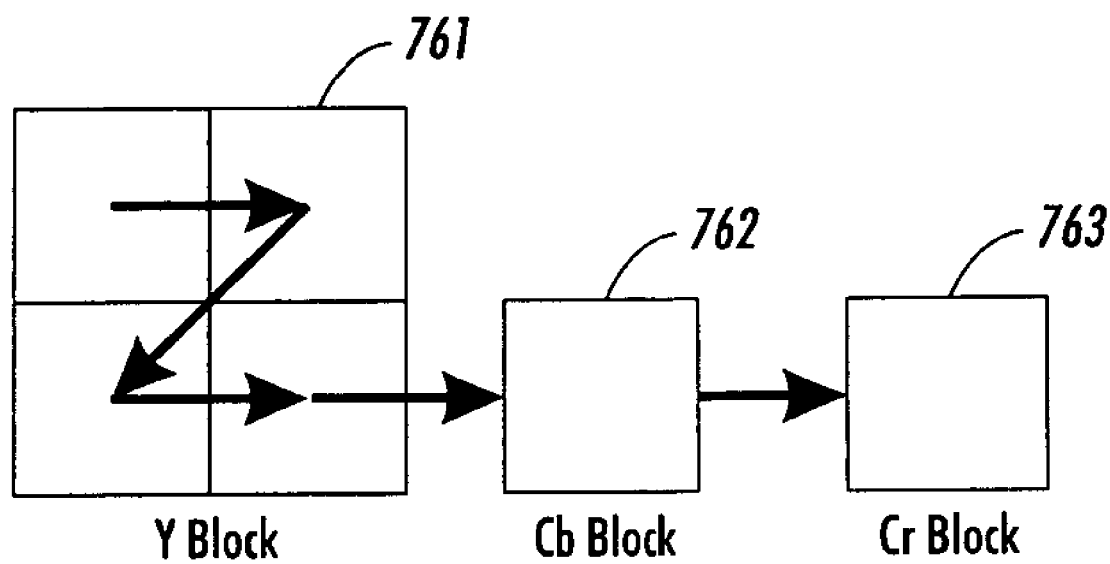
FIG. 10 illustrates the JPEG order of blocks within a minimum coded unit (MCU)

In some instances, the entire block of 32×32 pixels of either luminance or chroma data may consist entirely of holes, yielding sub-sampled Y, Cb and Cr blocks which are also all zeroes. Such blocks are filled with a constant color to improve compression. The particular constant color value is obtained from the average color of a temporally or spatially previous block. The previous block may be defined in accordance with the JPEG order of blocks within the MCU as indicated in FIG. 10. For example, if the Cb sub-sampled pixel block 762 contained all holes, it would be substituted with the average color of the luminance pixel block 761. Similarly, if the Cr sub-sampled pixel block 763 contained all holes, it would be substituted with the average color of the pixels in the Cb pixel block 762. If the very first block on the page is to be filled with a constant color, the average previous block value is assumed to be page white.

The process ensures a more desirable fill color for compression for each block. This reduces compression ringing artifacts by filling in the hole pixels with the block average. This completes the filling of the background layer.

If the resulting data is to be compressed, the image plane adjustment system 700 then sends the filled background plane to the compress module 800 for compression. As described earlier, the N-layer generating module 600 sends the other N-layer planes to the compress module for compression as well. Because the holes in the background plane have been filled by the background adjust module 700 with the average color of the other pixels in the background, the compress module 800 can compress the background plane more effectively, with fewer artifacts and less ringing of the boundaries between the filled holes and the remaining background. The compress module 800 may send the compressed background plane to a combiner which combines the compressed foreground layers with the compressed background plane into an n-layer PDF or TIFF file, for example, that is output to a downstream process.

Although the invention has been described in a hardware embodiment, the invention may also be practiced using a software implementation. In this case, software such as, for example, a computer program, may execute the steps of the method. The software can be executed by a suitably programmed microprocessor or ASIC, or it may be performed by some combination of software and hardware. The overall process exemplified by FIG. 4 can be performed by a microprocessor executing the steps shown in FIG. 11. The detailed description of the workings of modules 720, 730 and 740 can be performed by a microprocessor executing the steps shown in FIGS. 12-14, respectively.

Figure 11:
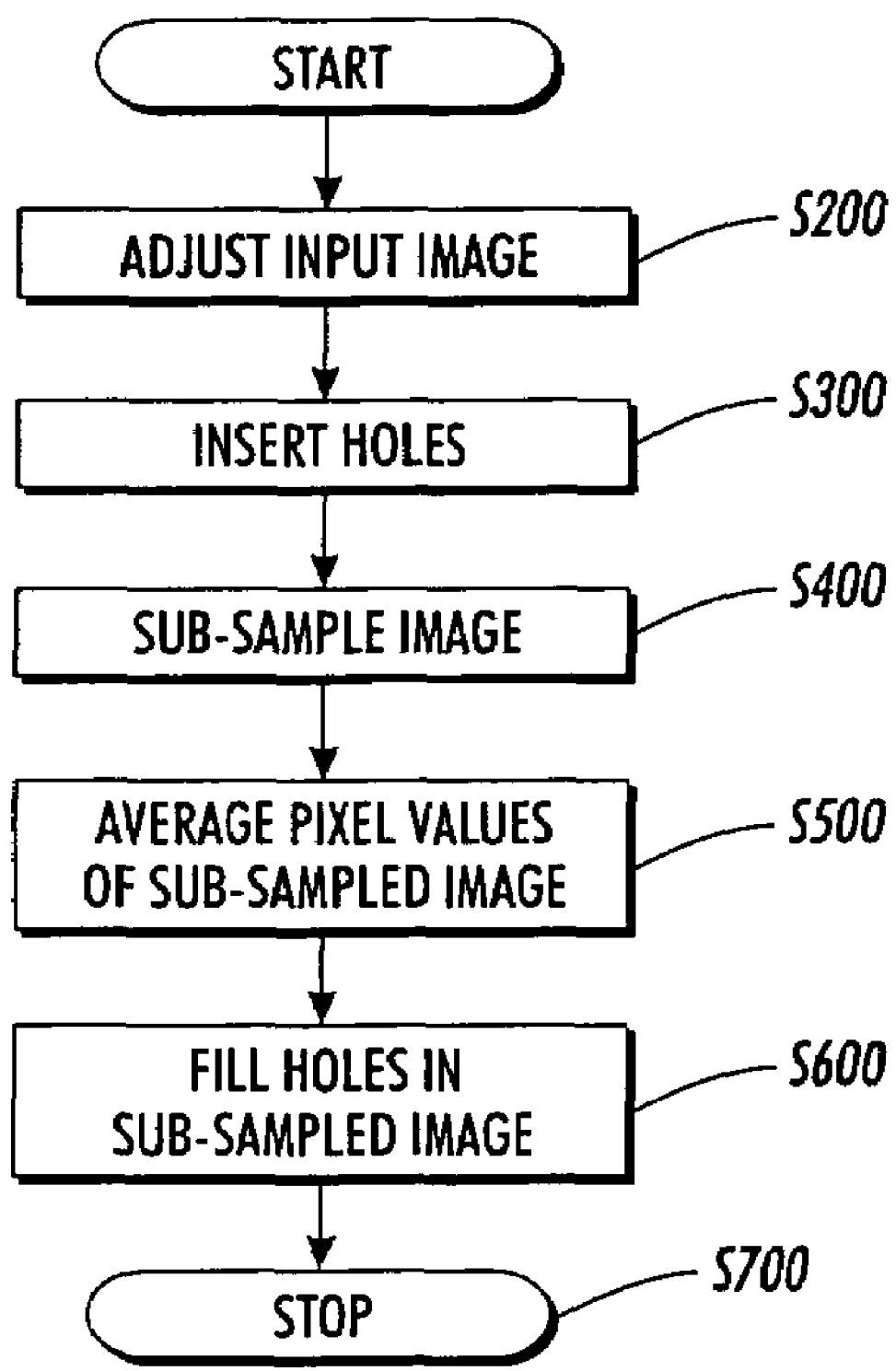
FIG. 11 is an exemplary flowchart outlining the processing of an image plane.

FIG. 11 is a flowchart outlining a method for adjusting the data of an image plane, in order to improve the compressibility of the image plane. The method starts and proceeds to step S200, wherein the input image is adjusted. In various exemplary embodiments, the input image may be adjusted according to a lookup table or functional dependency expressing the relationship between the input pixel value and the output pixel value. The lookup table may implement a tone reproduction curve on the input image data, for example. In step S300, holes are inserted into the image plane, by substituting zeroes for the pixel values for pixels which were lifted from the image plane into a binary foreground plane. In step S400, the input image is sub-sampled by 2:1 for the luminance data, and by 4:1 for the chroma data, to obtain the sub-sampled background plane.

In step S500, the average color value for the sub-sampled pixels in the sub-sampled image is obtained. In various exemplary embodiments, the average color value is obtained by adding all the non-zero pixels, and dividing by the number of non-zero pixels. In various exemplary embodiments, the division is accomplished by consulting a lookup table for an appropriate multiplier, and then right shifting the resulting bits. In step S600, the holes that were inserted in step S300, are filled by applying the average pixel value for the sub-sampled image, to the pixel value for the holes, which was previously set to zero by the hole insertion step S300. The process ends in step S700.

Figure 12:
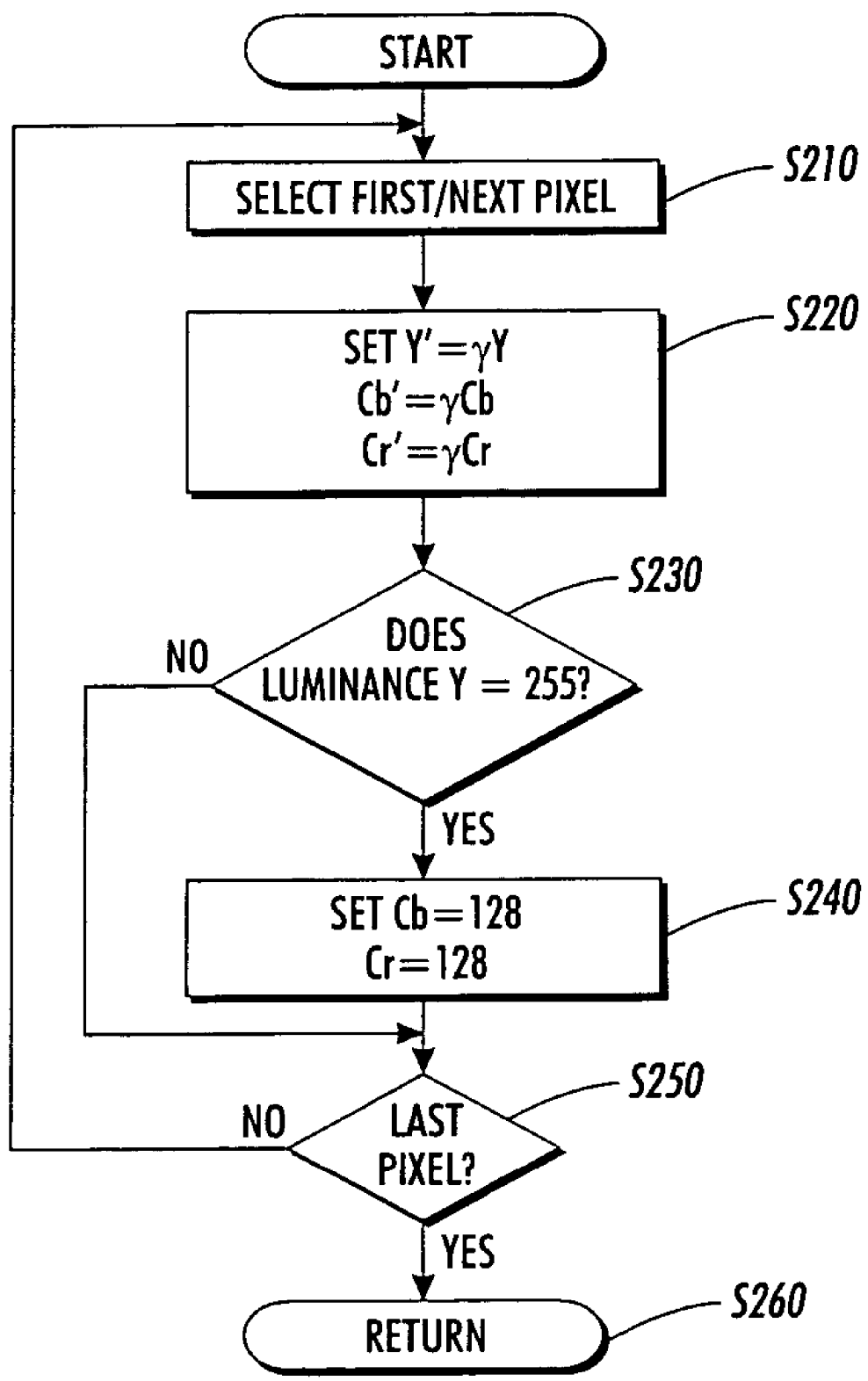
FIG. 12 is an exemplary flowchart outlining adjusting the input image to form an image plane.

FIG. 12 is a flowchart that outlines the process of step S200 in FIG. 11. In step S210, a first or next pixel is selected. The pixel value is then adjusted in step S220. In various exemplary embodiments, the adjustment is according to a gamma correction curve, such as that shown in FIG. 5. In step S230, a determination is made whether the luminance value of the selected pixel equals 255. If not, control jumps to step S250. If so, the chroma values of the pixel are set to 128. Control then proceeds to step S250, wherein a determination is made whether the selected pixel is the last pixel in the image. If not, control jumps back to step S210, wherein the next pixel is selected. In step S250, if the selected pixel is the last pixel in the image, the process ends in step S260.

Figure 13:
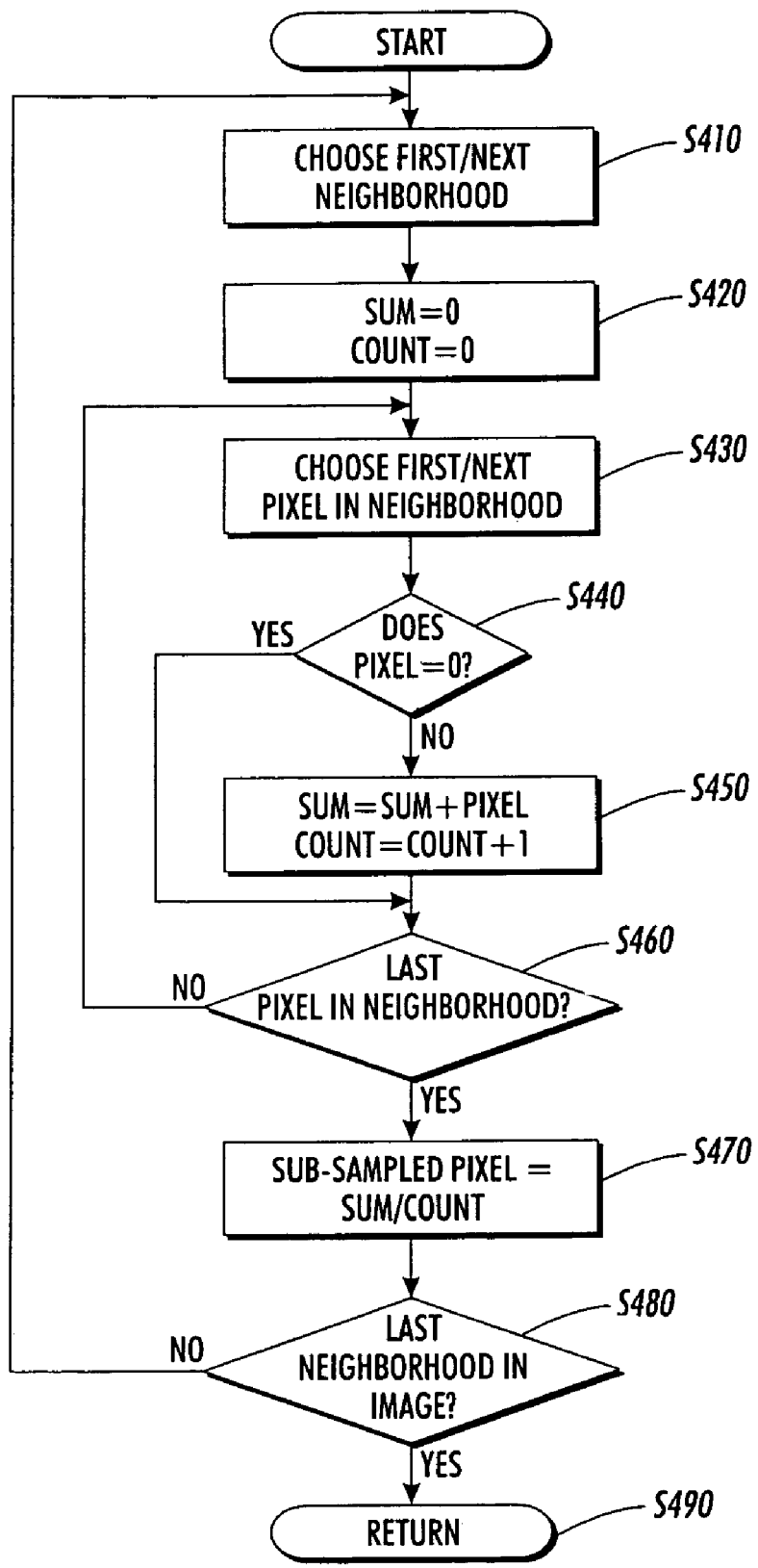
FIG. 13 is an exemplary flowchart outlining sub-sampling the image plane.

FIG. 13 is a flowchart outlining step S400 of FIG. 11. The process begins in step S410, wherein a first or next pixel neighborhood is chosen in the input image data. The size of the neighborhood corresponds to the amount of sub-sampling to be performed, for example, for 2:1 sub-sampling, the neighborhood is a 2×2 pixel window of data. Then the process goes to step S420. In step S420, the registers which will store the variables SUM and COUNT are initialized to zero, and the process goes to step S430. In step S430, the first or next pixel in the selected neighborhood is chosen, and the process goes to step S440. In step S440, a determination is made whether the value of the selected pixel in zero. If not, the value for the pixel is added to the variable SUM, and the COUNT is incremented by one, in step S450. If the pixel is zero, control jumps to step S460, wherein a determination is made whether the present pixel is the last pixel in the neighborhood. If not, control jumps back to step S430 wherein the next pixel in the neighborhood is selected.

If the pixel is the last pixel in the neighborhood, control continues to step S470, wherein a value for the sub-sampled pixel is, set to the average color value, which is the SUM value divided by the COUNT. In various exemplary embodiments, the division may be accomplished by finding an appropriate multiplier in a lookup table, and right-shifting the product of the multiplier and SUM. The process then proceeds to step S480, wherein a determination is made whether the neighborhood is the last neighborhood in the image. If not, control jumps back to step S410, to select the next neighborhood. If the neighborhood is the last in the image, the process ends in step S490.

Figure 14:
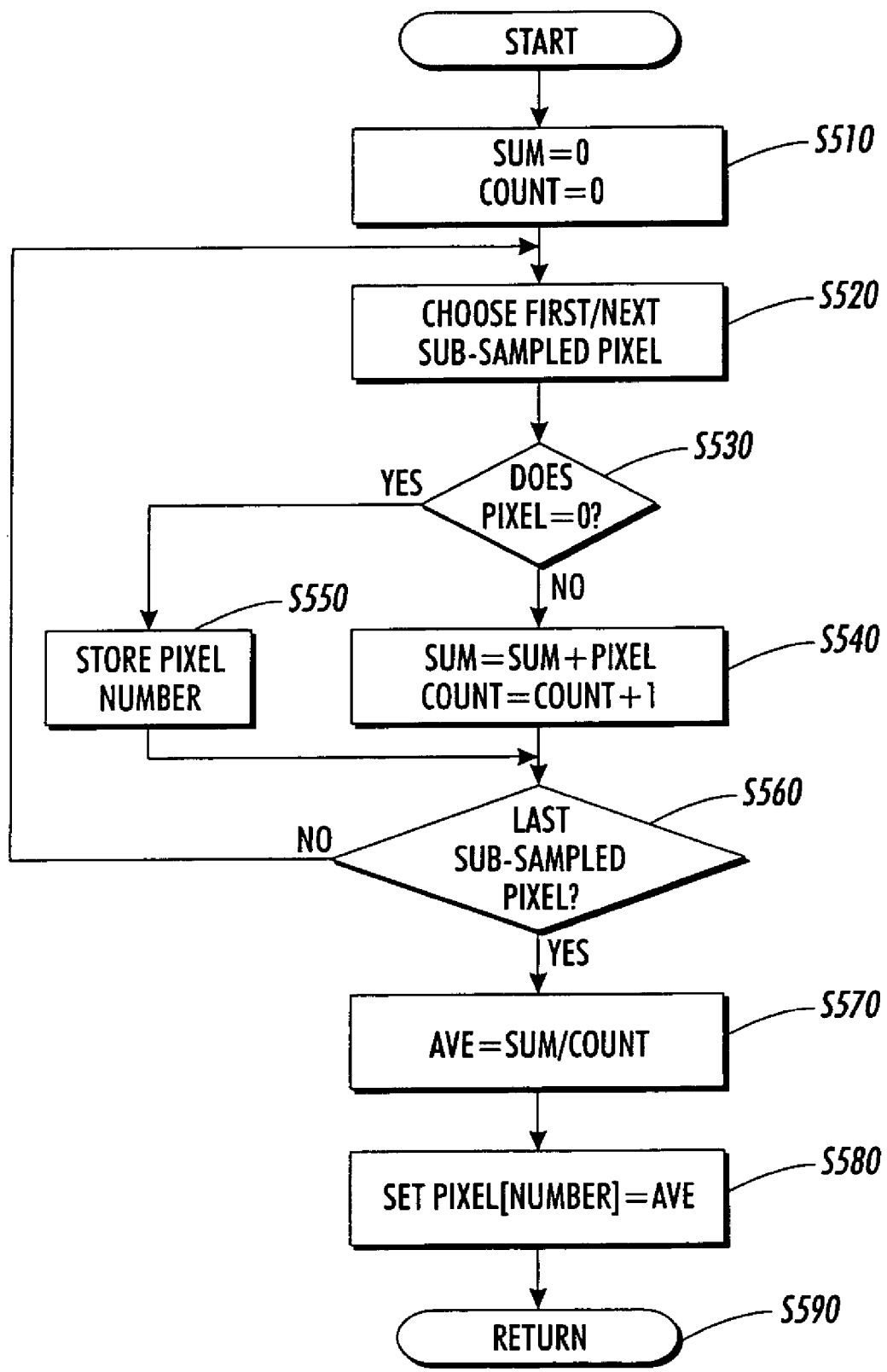
FIG. 14 is a flowchart outlining obtaining the average color of a sub-sampled image and filling the holes in the image plane.

FIG. 14 is a flowchart outlining step S500 of the flowchart of FIG. 11. The method begins in step S510, wherein the variables SUM and COUNT are initialized to zero, and the process proceeds to step S520. In step S520, the first or next sub-sampled pixel is chosen, and the process proceeds to step S530. In step S530, a determination is made whether the selected sub-sampled pixel is equal to zero. If so, the pixel number is stored in step S550 and the process proceeds to step S560. If not, the value of the sub-sampled pixel is added to the running sum SUM, and the COUNT is incremented by one in step S540. The process then proceeds to step S560, wherein a determination is made whether the sub-sampled pixel is the last in the set. If not, control jumps back to step S520, and the next sub-sampled pixel is chosen. If the sub-sampled pixel is the last, then the average color is calculated in step S570 by dividing the total SUM by the COUNT. In various exemplary embodiments, the division may be accomplished by obtaining the appropriate multiplier from a lookup table, and right-shifting the product of the multiplier and SUM. In step S580, the value of each of the stored pixels is set to the calculated average color. The process ends in step S590.

While the invention has been described in conjunction with various exemplary embodiments, these embodiments should be viewed as illustrative, not limiting. Various modifications, substitutes, or the like are possible within the spirit and scope of the invention. For example, instead of improving the compression characteristics of the image plane, data may be used which simply causes the compression algorithm to perform in a desired way. Also, other criteria may be used to select the type of data to substitute in the image plane, rather than compression characteristics. For example, data may be chosen which will alter the encoding characteristics of the image plane, or which will produce ringing artifacts of an advantageous or desirable type. Data may also be used which provides a security key for the data, to prevent unauthorized copying, such as a watermark.

What is claimed is:

1. A method for processing an image comprising:
   identifying pixels in the image which are less critical;
   substituting data into identified pixels, the data being chosen to provide a desired characteristic for processing the image;
   generating a hole-image by setting to zero pixel values of pixels identified to be less critical to the image;
   sub-sampling the hole-image, by averaging only non-zero pixel values in pixel neighborhoods to obtain sub-sampled pixel values for the sub-sampled hole-image, wherein each of the sub sampled pixel values has a non-zero value if a corresponding neighborhood has at least one non-zero pixel value, or a zero value if the corresponding neighborhood has all zero pixel values;
   averaging the non-zero sub-sampled pixel values of the sub-sampled hole-image to obtain an avenge value; and
   setting the sub-sampled pixel values of zero to the average value of the non-zero sub-sampled pixel values.

2. The method of claim 1, wherein the desired characteristic is at least one of a compression characteristic and a processing speed.

3. The method of claim 1, wherein the substituted data is an average of data values of non-identified pixels.

4. A method for processing an image to form a background plane and N-binary foreground planes, comprising:
   inserting zeroes into pixel data for pixels in the background plane corresponding to areas which have been placed into one of the N-binary foreground planes, to generate a hole-image;
   sub-sampling the hole-image to obtain one or more blocks of sub-sampled pixel values, each of the sub-sampled pixel values having a non-zero value if a corresponding neighborhood has at least one non-zero pixel value, or a zero value if the corresponding neighborhood has all zero pixel values;
   averaging color values of only non-zero sub-sampled pixel values in each of the blocks to obtain a block average color value for each of the blocks; and
   substituting sub-sampled pixel values of each of the blocks that are equal to zero to the block average color value of each of the blocks.

5. The method of claim 4, further comprising:
   identifying a previous block based on a predetermined criterion; and
   substituting an average color value of the previous block for sub-sampled pixel values in a block in which all of the sub-sampled pixel values are zero.

6. The method of claim 5, wherein the previous block is the previous block as defined by the JPEG order of blocks within a minimum coded unit.

7. The method of claim 4, further comprising one or more of:
   adjusting the image according to predefined requirements; and
   setting a chroma value of a pixel to a midpoint in its allowed range when a luminance value of the pixel is at a maximum of its allowed range.

8. Tire method of claim 4, wherein sub-sampling the hole-image comprises:
   averaging one or more pixel values within a neighborhood of pixels to obtain a sub-sampled pixel value that corresponds to the neighborhood.

9. The method of claim 8, wherein averaging the pixel values comprises:
   summing the pixel values within the neighborhood of pixels; and
   dividing the sum of pixel values by a number of only non-zero pixel values, to obtain the sub-sampled pixel value.

10. The method of claim 8, wherein the neighborhood of pixels is a 2×2 neighborhood for luminance data, and a 4×4 neighborhood for chroma data.

11. An apparatus that processes an image, comprising:
    a memory that stores image data and selector data, wherein the selector data identifies less critical portions of the image data;
    a processor that sets less critical portions of the image data to zero based on the selector data:
    a sub-sampling processor that sub-samples hole-image data and averages only the non-zero data values in a block of the sub-sampled hole-image data to obtain a block average valet; and
    a pixel substitutor which substitutes the block average value of only the non-zero data values for the zero values in the sub-sampled hole-image data.

12. The apparatus of claim 11, wherein the sub-sampling processor sub-samples the hole-image data by setting the sub-sample pixels to values equal to an average of only the non-zero pixels in contiguous, non-overlapping pixel neighborhoods.

13. The apparats of claim 12, further comprising:
    a hole-filler that identifies previous blocks based on predefined criteria, and replaces zero values of the blocks of sub-sampled hole-image data with a previous block average value, when the blocks of sub-sampled hole-image data consist entirely of zeroes.

14. The apparatus of claim 13, wherein the previous block is the previous block as defined by the JPEG order of blocks within a minimum coded unit.

15. A computer-readable medium having computer-readable program code embodied therein, the computer-readable program code performing the method of claim 1.

16. A xerographic marking device using the method of claim 1.

17. A digital photocopier using the method of claim 1.

* * * * *